(12) United States Patent
Fusco et al.

(10) Patent No.: US 6,454,178 B1
(45) Date of Patent: Sep. 24, 2002

(54) ADAPTIVE CONTROLLER FOR AN AUTOMOTIVE HVAC SYSTEM

(75) Inventors: Frank Fusco, Plymouth; Gerhard A. Dage, Franklin, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 10 days.

(21) Appl. No.: 09/681,714

(22) Filed: May 24, 2001

(51) Int. Cl.[7] .................................................. B60H 1/00
(52) U.S. Cl. ..................... 236/49.3; 236/91 E; 165/203; 165/237
(58) Field of Search .......................... 62/244, 186, 408, 62/161, 163; 236/49.3, 91 E; 165/203, 237, 205, 208, 209

(56) References Cited

U.S. PATENT DOCUMENTS

| | | | |
|---|---|---|---|
| 4,881,456 A | * 11/1989 | Yasuda et al. | 165/203 X |
| 5,390,728 A | * 2/1995 | Ban | 165/237 X |
| 5,860,593 A | 1/1999 | Heinle et al. | |
| 5,878,809 A | 3/1999 | Heinle | |
| 5,944,256 A | 8/1999 | Arai et al. | |
| 5,957,375 A | 9/1999 | West | |

* cited by examiner

Primary Examiner—Harry B. Tanner
(74) Attorney, Agent, or Firm—Raymond L. Coppiellie

(57) ABSTRACT

A multi-zone climate control system and method for a vehicle. The system comprises a passenger seat occupancy detector at each of a plurality of passenger seats for generating a respective seat occupancy signal indicative of an occupancy condition of a respective seat. The system also includes a plurality of control units, wherein each of the control units is associated with a respective passenger seat location. The control units are used for selecting desired climate settings for each passenger location. A controller is in operative communication with each control unit and each passenger seat occupancy detector. The controller is operative to control the climate at each occupied passenger location according to the desired climate settings for the respective passenger location and modify the climate at each unoccupied passenger location to optimize the comfort at each occupied passenger location.

9 Claims, 2 Drawing Sheets

ADAPTIVE CONTROLLER FOR AN AUTOMOTIVE HVAC SYSTEM

BACKGROUND OF INVENTION

This invention relates to automotive climatic control systems and more particularly concerns a method and apparatus for adaptively controlling a multi-zone climate control system as a function of the presence of vehicle occupants and/or the prior manual override history of an occupant.

Electronic climate control systems for motor vehicles typically include one or more zones controllable by adjusting the temperature of air flowing into each zone and even the rate of air flow in accordance with the temperature or comfort set points which are set by occupants of each zone and set climate conditions in each zone. Other factors such as an outside temperature and sun load which are important to occupant comfort are measured and included in a control algorithm which determines adjustments to temperature and air flow.

Multi-zone heating ventilation and air conditioning (HVAC) systems, the zone outputs typically controlled to achieve the settings made by previous occupants. In other words, upon engine start-up, the settings of the prior vehicle occupants govern the climate control system output for each zone. On occasion, this may be counterproductive in that the prior settings may be requiring the climate control system to, for example, heat the respective zone when cooling is desired instead. In addition, if a zone is unoccupied, the control settings for that zone may have a detrimental influence on the comfort level of the occupants in the occupied zones. This typically necessitates the driver and/or other occupants having to adjust the control settings for the unoccupied zones or shut off the controls for the unoccupied zones. Thus, there exists a need for a multi-zone automotive climate control system having adaptive zone control as a function of vehicle seat occupancy.

Current automotive climate control systems having automatic temperature control provide manual overrides in the event that the program control algorithm does not provide optimal comfort for the occupant. For example, for a given detected sun load, conventional automatic temperature control algorithm modify the temperature output of the climate control system to adjust for the sun load as a function of a sun load compensation coefficient. If the vehicle occupant was unsatisfied with the output modification, a manual override would result. Consistent manual overrides of the automatic temperature control system, however, can result in a dissatisfaction with the general automatic temperature control feature. Thus, there exists a need for an automotive climate control system having automatic temperature control with adaptive learning to address consistent occupant overrides of the automatic temperature control algorithm.

SUMMARY OF INVENTION

Accordingly, it is an object of the present invention to provide an improved multi-zone automotive climate control system. Another object of the present invention is to provide an automotive climate control system having improved automatic temperature control. According to the present invention, the foregoing and other objects and advantages are obtained by a multi-zone climate control system for a vehicle. The system comprises a passenger seat occupancy detector at each of a plurality of passenger seats for generating a respective seat occupancy signal indicative of an occupancy condition of a respective seat. The system also includes a plurality of control units, wherein each of the control units is associated with a respective passenger seat location. The control units are used for selecting desired climate settings for each passenger location. A controller is in operative communication with each control unit and each passenger seat occupancy detector. The controller is operative to control the climate at each occupied passenger location according to the desired climate settings for the respective passenger location and modify the climate at each unoccupied passenger location to optimize the comfort at each occupied passenger location.

In another aspect of the invention, when a respective control unit is operating in an automatic climate control mode, the controller detects any manual overrides of the automatic mode parameter settings. Upon the detection of such a manual override, the controller stores the associated transient thermal condition event associated with the manual override input. For example, the sun load change which caused the occupant to override the automatic climate control system. The controller is further operative to adaptively modify an automatic mode compensation coefficient in response to the manual override input as a function of said transient thermal condition event and the manual override. In this way, upon the occurrence of a similar transient thermal condition event, the corresponding compensation coefficient will have been modified thereby reducing the likelihood that a manual override of the climate control parameters will be necessary by the respective occupant.

Other objects and advantages of the invention will become apparent upon reading the following detailed description and appended claims, and upon reference to the accompanying drawings.

BRIEF DESCRIPTION OF DRAWINGS

For a more complete understanding of this invention, reference should be made to the embodiments illustrated in greater detail in the accompanying drawings and described below by way of examples of the invention.

DETAILED DESCRIPTION

Figure 1:
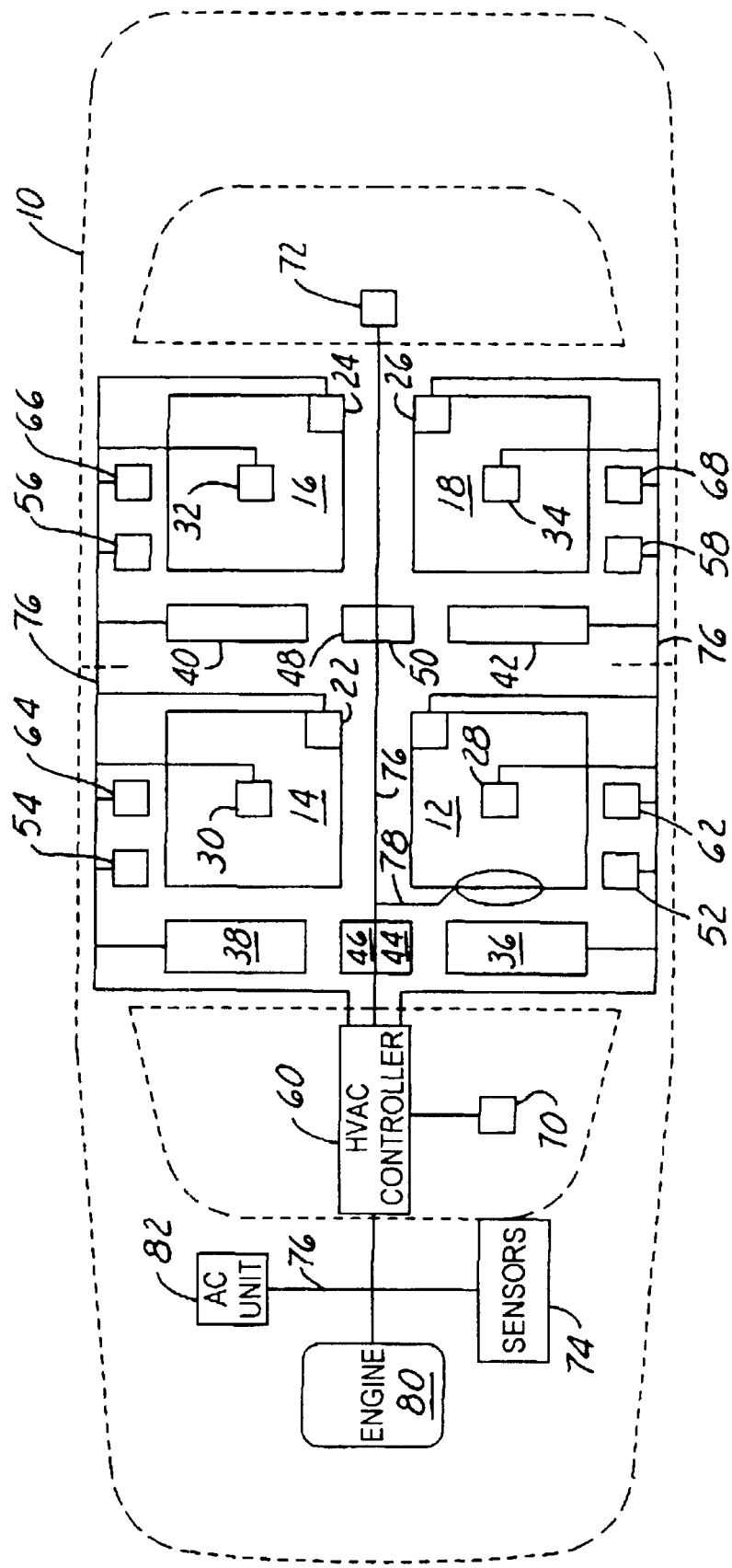
FIG. 1 is a schematic view of a multi-zone automotive climate control system in accordance with one embodiment of the present invention.

Referring now to FIG. 1, there is shown a schematic block diagram of a vehicle 10 equipped with a quad-zone automatic climate control system according to one embodiment of the present invention. The vehicle 10 is a four-passenger vehicle having a front left side driver seat 12, a front right side passenger seat 14, a rear right side passenger seat 16 and a rear left side passenger seat 18. Each respective seat is equipped with a respective occupant safety belt detector sensor 20, 22, 24, 26, and a respective occupancy detector 28, 30, 32 and 34. Each occupant seat is serviced by separately controlled climate control outlets 36, 38, 40, 42.

In addition, in the quad-zone arrangement shown in FIG. 1, each occupant is presented with a respective climate control interface 44, 46, 48, 50 through which to control the respective climate control outlets and air temperature in the respective occupant's zone.

Each occupancy zone may also be equipped with one or more temperature sensors 52, 54, 56, 58 to provide feedback to the HVAC controller 60 regarding the temperature conditions within each occupancy zone. Each occupancy zone may also include a sun load sensor 62, 64, 66, 68 to provide a signal indicative of the solar load at each window of a respective occupancy zone to the controller 60. The vehicle 10 may be equipped with fore and aft sun load sensors 70, 72 for the same purpose. The signals provided from the sun load sensors 62, 64, 66, 68 can be combined and arranged in the controller 60 to provide a control input signal representative of the solar radiation intensity on the vehicle interior. Alternatively, the signals from the sensors can be used individually to provide a control input signal representative of the solar radiation intensity at the respective window of each occupancy zone. Alternatively, a single fore solar sensor 70 and/or aft solar sensor 72 could be used to provide a combined solar intensity signal or individual solar intensity signals to the controller 60.

Additional sensors 74 also provide inputs to the HVAC controller 60. The sensors include at least an outside temperature sensor and, preferably, a front humidity sensor and an air quality sensor.

The climate control outlets 36, 38, 40 and 42, the climate control interfaces 44, 46, 48, 50 as well as all of the aforementioned sensors communicate with the HVAC controller 60 along a communication bus 76. In addition, the HVAC controller 60 receives an input signal 78 indicative of the ignition on status of the vehicle. The HVAC controller 60 also communicates with the vehicle engine 80 and air conditioning unit 82 to determine their on/off status.

The controller 60 is preferably a microprocessor based controller which includes a central processing unit and associated memory such as read only memory (ROM) and random access memory (RAM) as well as input and output ports for receiving information from and communicating information to the various sensors, climate control outlets, and climate control interfaces.

In operation, each occupant uses their respective climate control interface 44, 46, 48, 50 to select desired control settings for the heating or cooling of their respective occupancy zone. Thus, for example, each occupant could set at least the desired temperature of the air flowing through their respective climate control outlets and preferably, the arrangement of the climate control outlets as well, i.e., whether the air is directed toward the floor of the vehicle or the interior of the vehicle or both. Each climate control interface also allows the respective occupant to set the fan or blower speed for their respective occupancy zone.

The driver side climate control interface also includes automatic temperature control functionality which allows the driver to set a desired temperature which is then automatically maintained by the HVAC controller 60. In automatic climate control mode, the interior air temperature sensors 52, 54, 56, 58 provide the primary input to the HVAC controller 60 with the outside air temperature sensor 74 and solar load sensors 62, 64, 66, 68 providing further input to the HVAC controller for climate control. The outside temperature sensor 74 and interior temperature sensors provide a differential measurement between the passenger compartment and the exterior environment which affects the rate of heat transfer there between, while the solar sensors provide a measure of the intensity of the solar radiation on the vehicle interior. An engine coolant temperature sensor 74 also provides a signal to the HVAC controller which is indicative of the availability of heat from the heater core. Another input to the automatic climate control scheme includes the operator selected temperature setting which corresponds to the desired temperature level for that occupancy zone. In the automatic climate control mode, the various inputs are monitored and processed to control temperature maintenance functions of the heater, evaporator and blower assembly which includes: a heater core for circulating engine coolant for warming air, an evaporator core for circulating refrigerant or cooling air, a blower or fan for circulating air through the heater and evaporator cores in proportion to the position of an air mix door as determined by solenoid operated vacuum switches or electrical motors responsive to the HVAC controller outputs. The position of the air mix door determines the temperature of the air circulated by the heater evaporator and blower assembly. The heater evaporator and blower assembly often also includes control of existing air to passenger determined modes such as lower, upper, bi-level, defog and defrost and entering air between fresh and recirculated modes. The particular algorithm for automatically achieving the desired user settings and maintaining such settings can be any known automatic climate control scheme.

In operation, such automatic climate control schemes control the heater, evaporator and blower assembly to maintain the desired temperature level selected by the occupant. Thus, for example, as the outside temperature falls, the automatic climate control system will increase the amount of warm air circulating through the heater core to maintain the desired thermal level. Likewise, if the outside temperature was to increase and/or the solar load increase by a predetermined amount as indicated by sun load sensors, the HVAC controller would control the heater, evaporator and blower assembly to circulate more air through the evaporator core for cooling the occupancy zone to maintain the desired thermal level. The HVAC controller 60 maintains the desired thermal level by feedback control. The feedback scheme includes fixed gain constants which represent, for example, the sun load compensation coefficient that regulates the amount of increased air cooling output by the system in response to a given detected solar load. As described in more detail below with reference to FIG. 3, the automatic climate control system allows for manual overrides. Thus, if an occupant was unsatisfied with the response of the automatic climate control system to transient changes in the exterior temperature or the solar load on the vehicle, the occupant could increase or decrease-the heating or cooling effect accordingly.

Figure 2:
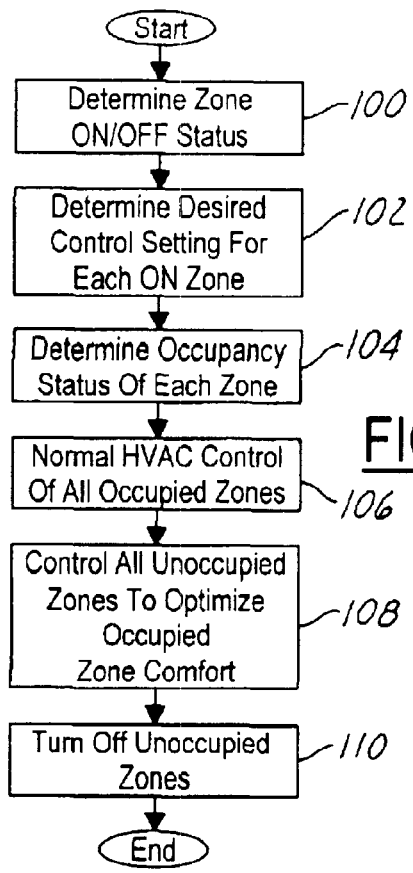
FIG. 2 is a logic flow diagram of one embodiment of controlling the multi-zone automotive climate control system of FIG. 1.

Referring now to FIG. 2, there is shown a logic flow diagram of one method of controlling the climate control system of FIG. 1in accordance with the present invention. Logic routine begins at step 100 by determining the on and off status of each occupancy zone climate controller 44, 46, 48 and 50. Preferably, this step is performed upon the HVAC controller 60 receiving an ignition on signal along signal line 78. In step 102, the desired control settings for each zone in the ON state are determined. In step 104, the occupancy status of each zone is determined. This can be accomplished in several ways. Preferably, the occupancy status of each zone is determined by monitoring the status of the seatbelt sensors 20, 22, 24, 26 which, when the respective seatbelt is engaged, would indicate an occupied status for the respective zone to the HVAC controller 60. An occupancy zone would be declared unoccupied if the respective seatbelt sensor was not activated after a predetermined amount of time. Alternatively, or in addition to the seatbelt sensors, occupancy sensors 28, 30, 32, 34 can provide an indication of the occupancy status of each respective zone.

In step 106, for each occupied zone, the HVAC controller would automatically control the zone settings and outputs to provide optimal comfort to all of the occupied zones. In step 108, the unoccupied zones are also preferably controlled by the HVAC controller 60 to optimize, the comfort level of the occupants in the occupied zones. Thus, for example, if the passenger seat 16 was unoccupied and passenger seat 18 was occupied, the zone controller 48 for passenger seat 16 and corresponding climate control outlets 40 would be controlled by the HVAC controller 60 to aid in achieving the desired comfort level as determined by the occupied zone settings of the control interface 50. After a predetermined period of time or after the occupied zones have achieved a desired thermal comfort level, the unoccupied zones are turned off to reduce electrical loading as shown in step 110. Additionally, it is advantageous to turn off any unoccupied zone if at any time, the electrical loading on the vehicle becomes excessive.

From the foregoing, it can be seen that the present system and method has advantages over conventional multi-zone climate control systems in that it reduces the influence of unoccupied zone control settings on the occupied zone climate control operation. The present method therefore eliminates, for example, the need for the driver to turn off or adjust the climate control settings of the other occupancy zones when they are unoccupied.

Figure 3:
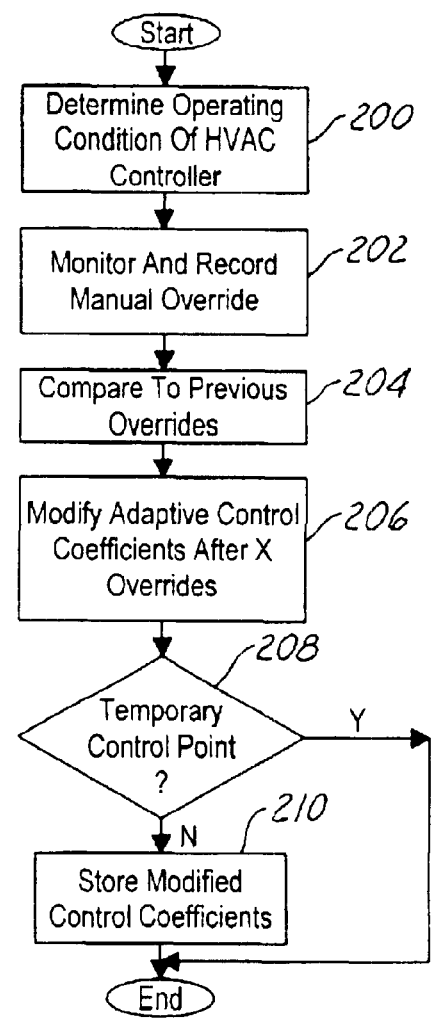
FIGS. 3 is a logic flow diagram of a second embodiment for controlling the multi-zone automotive climate control system of FIG. 1.

Referring now to FIG. 3, there is shown a logic flow diagram of an additional control scheme for the automotive climate control system of FIG. 1. The logic routine of FIG. 3 describes and adaptive control scheme for the occupancy zones equipped with automatic climate control functionality. This would include at least the driver's climate control zone. AS mentioned above, automatic climate control modifies the output of the heater, evaporator and blower assembly to achieve a desired thermal set point selected by the vehicle occupant in that zone. The automatic climate control system adjusts the output of the heater, evaporator and blower assembly to maintain a desired thermal set point in response to thermal transients caused by outside temperature changes or solar loads upon the occupancy zones of the vehicle. The logic routine of FIG. 3 addresses the shortcoming of conventional automatic climate control systems in that they are limited to a predetermined control scheme for responding to such transient thermal loads and, therefore, may necessitate consistent manual overrides of the system response to achieve a desired level of occupant comfort.

The adaptive control scheme begins in step 200 by determining the operating conditions under which the HVAC controller is currently operating to achieve the desired thermal set point of the occupant. This step would include determining whether the automatic climate control system is activated and, if so, determining the desired occupancy zone thermal set point, the external temperature and preferably the solar load on the vehicle. In step 202, this information is recorded against any manual overrides detected by the system. Any manual overrides are then compared to previous overrides to discern a consistent pattern. After a predetermined number of consistent overrides in response to similar thermal transient, the adaptive control coefficient of the automatic climate control scheme is modified in step 206 to incorporate the manual override desires upon the next occurrence of similar thermal transient conditions.

In step 208, it is determined whether the transient thermal condition which resulted in the manual override and modification of the adaptive control coefficient can be classified as a temporary transient thermal condition or normal transient thermal condition. If the override and modification resulted from temporary meteorological conditions, the modification would be classified as a temporary control point modification in step 208 and would be reset upon ignition off of the vehicle. Accordingly, such adaptations would not be retained in the memory of the HVAC controller when the vehicle was cycled to ignition off. An example of a temporary meteorological condition would be an override such as overrides for frequent defrost selections which would only be applicable for that ignition cycle wherein the system would increasingly deposit more air flow to the windshield to prevent the continual manual selection of defrost. Most modifications however would be stored in memory in step 210. For example, if the occupant decreased the temperature by 2 degrees each time the sun load exceeded a predetermined transient change, the sun load compensation coefficient would be modified in step 206 and stored in step 210 to increase the compensation by 2 degrees such that upon the next occurrence of a similar detected sun load transient, the automatic climate control system would use the modified sun load compensation coefficient to adjust the temperature accordingly thereby eliminating the need for the operator to manually override the system as had been done in the past.

From the foregoing, it can be seen that there has been brought to the art a new and improved multi-zone climate control system which operates as a function of occupied vehicle zones as well as adaptively learns the preferred response of the climate control system in response to transient thermal changes. While the invention has been described in connection with one or more embodiments, it is to be understood that it is not limited to those embodiments. On the contrary, the invention covers all alternatives, modifications and equivalents, as are contemplated within the spirit scope of the appended claims.

What is claimed is:

1. In a multi-zone climate control system for a vehicle comprising a passenger seat occupancy detector at each of a plurality of passenger seats for generating a respective seat occupancy signal indicative of an occupancy condition of a respective seat, a plurality of control units, each of said control units associated with a respective passenger seat location for selecting desired climate settings for each said location, and a controller in operative communication with each control unit and each passenger seat occupancy detector, a method of operating the climate control system comprising the following steps:

determining the occupancy status of each passenger seat as a function of said passenger seat occupancy detectors;

controlling the climate at each occupied passenger location according to the desired climate settings for each said respective location;

turning off each control unit at a respective unoccupied passenger location;

when operating a respective control unit in an automatic mode, detecting a manual override of said automatic mode parameter settings;

storing a transient thermal condition event associated with said manual override input; and adaptively modifying an automatic mode compensation coefficient in response to said manual override input as a function of said transient thermal condition event and said manual override.

2. The method of claim 1 further comprising the step of optimizing the comfort at each occupied passenger location by modifying the climate at each unoccupied passenger location as a function of the desired climate settings at each respective occupied passenger location.

3. The method of claim 1 wherein the step of determining the occupancy status of each passenger seat includes the step of monitoring the status of a seat belt latch sensor at each passenger seat.

4. The method of claim 1 further comprising the step of determining the on/off status of each respective control unit.

5. The method of claim 4 further comprising the step of determining the desired control settings of each respective control unit associated with a respective passenger location.

6. The method of claim 1 wherein the step of adaptively modifying includes the step of adaptively modifying an automatic mode compensation coefficient in response to a predetermined number of manual override inputs for a similar transient thermal condition event.

7. A climate control system for a vehicle comprising:
   a plurality of control units, each of said control units associated with a respective passenger seat location for selecting desired climate settings for each said location;
   a controller in operative communication with each control unit, said controller programmed to perform the following steps:
      automatically control the air temperature and flow at each of said locations to maintain the environment at each location at the respective desired climate settings when said respective control unit is in an automatic mode;
      detect a manual override of each of said automatic mode parameter settings; store a transient thermal condition event associated with each said manual override input; and
      adaptively modify an automatic mode compensation coefficient associated with each said respective control unit in response to said respective manual override input as a function of said transient thermal condition event and said respective manual override.

8. The climate control system of claim 7 further comprising:
   a plurality of separately controllable climate control outlets at each of the plurality of passenger seats;
   a sun load sensor for providing a solar intensity signal indicative of the solar load on said vehicle;
   an external temperature sensor for providing a first temperature signal indicative of the ambient air temperature outside the vehicle; and
   an internal temperature sensor for providing a second temperature signal indicative of the ambient air temperature inside the vehicle,
   wherein said controller is in operative communication with each separately controllable climate control outlet, and each of said sun load and temperature sensors and wherein said controller is programmed to perform the following steps:
      automatically control the air temperature and flow at each of said locations as a function of said solar intensity signal and first and second temperature signals to maintain the environment at each location at the respective desired climate settings when said respective control unit is in an automatic mode.

9. The climate control system of claim 7 wherein said controller is programmed to adaptively modify an automatic mode compensation coefficient associated with each respective control unit in response to a predetermined number of manual override inputs at said respective control unit in response to a similar transient thermal condition event.

* * * * *